United States Patent Office 3,250,617
Patented May 10, 1966

---

3,250,617
PHOTOGRAPHIC ELEMENTS PROTECTED AGAINST ULTRAVIOLET RADIATION
George W. Sawdey, Rochester, N.Y., assignor to Eastman Kodak Company, Rochester, N.Y., a corporation of New Jersey
No Drawing. Filed Mar. 29, 1962, Ser. No. 183,417
14 Claims. (Cl. 96—55)

The present invention concerns new photographic elements, and more particularly, color photographic elements protected against the harmful effects of ultraviolet radiation.

It is well-known in the art that ultraviolet radiation has a detrimental effect on photographic layers. Ultraviolet radiation is a particular problem in color photography in that such ultraviolet radiation causes blue shadowing and blue fringing in multilayer color films and fading of dyes and printout in color prints. Accordingly, it is highly desirable in the photographic art to filter out ultraviolet radiation below the visual region of the spectrum by incorporating ultraviolet absorbers on photographic elements.

However, a large number of known ultraviolet absorbers are not practical for photographic use as they have too much absorption in the visible spectrum and thus render an undesirable color to such photographic products as color prints. In addition, many known ultraviolet absorbers are not inert to photographic emulsions or to photographic processing solutions. For example, an ultraviolet absorber on a photographic element should not desensitize or cause fogging to an undesirable degree. Also, a suitable ultraviolet absorbing material for photographic use should be capable of being readily incorporated in photographic layers by conventional methods. Such desirable properties are not possessed by many compounds that absorb in the ultraviolet region of the spectrum.

It is therefore an object of the present invention to provide novel color photographic elements protected against the harmful effects of ultraviolet radiation with a new class of photographic ultraviolet absorbing addenda.

It is another object of this invention to provide novel taking filters for photographic color films, such taking filters substantially reducing blue shadowing and blue fringing in the processed films.

It is likewise an object of this invention to provide novel photographic color prints protected against fading with a novel ultraviolet absorber.

It is a still further object of this invention to provide novel color photographic elements protected against the harmful effects of ultraviolet radiation by incorporation of a novel class of ballasted or nonmigratory ultraviolet absorbers thereon.

It is a still further object of this invention to provide novel color photographic elements protected against the harmful effects of ultraviolet radiation by incorporation of a novel class of ultraviolet absorbers mordanted in a layer on the photographic elements.

These and other objects of the invention are accomplished with color photographic elements having a layer containing an ultraviolet absorber having the formula

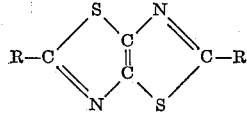

wherein R is a phenyl radical. The substituent R typically has the formula

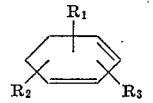

wherein $R_1$, $R_2$, and $R_3$ can be hydrogen atoms, alkyl radicals, alkoxy radicals, halogen radicals (e.g. Br, Cl, and I) or hydroxy radicals, the alkyl and alkoxy radicals suitably having 1 to 22, and more generally 1 to 10, carbon atoms. $R_3$ can also be a strongly acidic salt-forming radical such as

—$SO_3H$, —$PO_4H$, and the like, and including alkali metal salts thereof. Any of the substituents $R_1$, $R_2$, or $R_3$ can be in the ortho, meta, or para positions in the phenyl nucleus.

When compounds with $R_1$, $R_2$, and $R_3$ in the above formula having substituents with at least about 8 carbon atoms are utilized in photographic elements, such compounds are substantially non-migratory and need not be mordanted in photographic layers of photographic elements. The corresponding lower homologues not having such ballasting groups but having salt-forming groups, e.g., carboxyl or sulfonic acid can be readily mordanted in photographic layers. Such migratory compounds having 1 to 7 carbon atoms also have utility in postprocessing baths of color prints, for example.

In general, when the subject ultraviolet absorbers have alkyl radicals in the ortho, meta, or para positions, or alkoxy or hydroxy radicals in the meta or halogen radicals in the ortho positions of the phenyl nuclei, or when R in the above formula is an unsubstituted phenyl radical, such ultraviolet absorbers generally have substantially no absorption beyond about 400 m$\mu$. Such are substantially colorless ultraviolet absorbers and have particular utility when utilized for protecting color print papers against the harmful effects ultraviolet light has on photographic dyes. However, such colorless ultraviolet absorbers of the invention can also be utilized as taking filters in camera films to prevent overexposure of the blue-sensitive layer by ultraviolet light.

In general, when the subject ultraviolet absorbers have alkoxy radicals in the ortho or para positions, or hydroxy radicals in the ortho or para positions, there is generally a modicum of visible absorption, such compounds generally absorbing at less than about 410 m$\mu$. Such a small amount of visible absorption is desirable when the subject ultraviolet absorbers are utilized as taking filters for in-camera materials such as photographic color films. Such absorbers having a small amount of absorption (preferably at least .5 $d_{400\ m\mu}$) in the visible portion of the spectrum reduce the relative speed of the blue-sensitive emulsion due to the slight yellow color of the absorber. This slight absorption in the lower portion of the visible spectrum reduces blue shadowing and blue fringing in the resulting processed color photographic product. The cause of such blue shadowing and blue fringing in the typical color photographic products has been found to be an overexposure of the blue-sensitive layer relative to the red- and green-sensitive layers, such being obviated with the present ultraviolet absorbers.

Salt-forming radicals on the phenyl radicals of the subject ultraviolet absorbers facilitate their incorporation into photographic gelatin layers by the so-called "Fischer method" as described in U.S. Patents 2,685,512, issued August 3, 1954; 2,719,086, issued September 27, 1955; 2,739,888, issued March 27, 1956; 2,747,996, issued May 29, 1956; 2,784,087, issued March 5, 1957; 2,798,067, issued July 2, 1957; and 2,875,053, issued February 27, 1959. The Fischer method of incorporation avoids unwanted crystallization or other aggregation of particles and is utilized in the incorporation of nondiffusing or nonmigratory compounds of the invention containing salt-forming solubilizing groups so that they can be dissolved in water as alkali metal salts and the resulting solution added to an aqueous gelatin-coating composition.

Another technique of incorporating the ultraviolet absorbing compounds of the invention into photographic layers is by dissolving the absorbers in a polar solution such as water and/or methanol and then bathing the photographic gelatin coating in this solution. A typical example of this method is disclosed in U.S. Patents 2,685,512, 2,719,086, 2,747,996, and 2,808,330. Such an imbibition method is advantageous for incorporation of the subject ultraviolet absorbers onto processed photographic color prints, for example, for the purpose of protecting the color dyes present from the harmful effects of ultraviolet radiation.

Another typical method for incorporating the subject ultraviolet absorbers on photographic elements is in finely divided noncrystallized form as a solvent dispersion in which nondiffusing or nonmigratory addenda of the invention are dissolved in an organic solvent and the resulting solution intimately blended in an aqueous gelatin solution. This technique as applied to photographic color couplers is described in U.S. Patents 2,322,027, issued June 15, 1943; 2,801,170 and 2,801,171, both issued June 30, 1957; 2,870,012, issued June 20, 1959; 2,991,177, issued July 4, 1961. A typical example of the use of the solvent-dispersion technique as applied to incorporation of ultraviolet absorbers in photographic elements is described in U.S. Patent 2,739,888, issued March 27, 1961.

The subject ultraviolet absorbers can also be mordanted in photographic layers in accordance with usual practice, such techniques being desirable when utilizing the ultraviolet absorbers that are free of long-chain alkyl or alkoxy substituents. Any of the well-known basic mordanting materials, whether quaternized or unquaternized, that are conventionally used in photographic elements can be employed. Such mordants are typically high molecular weight amines. A particularly useful class of basic mordants was disclosed by Minsk in U.S. Patent 2,882,156, issued April 14, 1959.

The ultraviolet absorbing compounds of the invention can be incorporated in the photographic element in a variety of ways as described above, depending on the ultimate use of the photographic element, and the degree and type of protection desired. Advantageously, the ultraviolet absorbing compound can be dissolved or dispersed in a solvent medium together with a celloidal binder, such as gelatin, cellulose esters (e.g., cellulose acetate, etc.), synthetic resins (e.g., polyvinyl acetals, hydrolyzed polyvinyl acetate, etc.) or the like, and resulting mixture coated over the light-sensitive layer of the photographic element. Where the photographic element is a material intended for use in multilayer color photography, the ultraviolet light filter layer need not be an outer layer, but this layer can be placed over any of the light-sensitive layers subject to the harmful effects of ultraviolet radiation. If desired, the material useful in absorbing the ultraviolet radiation can be incorporated directly in the light-sensitive emulsion instead of, or in addition to, being present in another layer. For use as ultraviolet filters for in-camera taking filters, the subject ultraviolet absorbers are effectively utilized in layers that will filter the blue-sensitive layer, such serving to obviate blue fringing and blue shadowing.

The amount of ultraviolet absorbing compund used can be varied in accordance with usual practice, the amount utilized depending upon the effect desired and the use to which the material is to be put. Generally, at least 10 mg. of ultraviolet absorber per square foot of photographic element is utilized.

The invention is further illustrated by the following examples of preferred embodiments thereof.

Examples 1 to 24 below are typical photographic ultraviolet absorbing compounds of the invention, Examples 1 to 8 being illustrative taking filters having a modicum of yellow color for use on negative and reversal color films and Examples 9 to 24 being illustrative ultraviolet filters that are substantially colorless for use on processed color photographic elements such as color prints, color negatives, color transparencies and the like. The ultraviolet absorbing compounds in Examples 1 to 24 have the following formula

wherein R is a phenyl radical as described in Table A below.

Table A

| Example | R | Max. (m$\mu$) and Solvent | $E_{max} \times 10^{-4}$ | $d_{400\ m\mu}$ |
|---|---|---|---|---|
| 1 | ⟨phenyl⟩–OH | 377 (Dioxane) | 4 | 1.5 |
| 2 | HO–⟨phenyl⟩– | 370 (Dioxane) | 4.4 | 0.55 |
| 3 | NaO$_3$S–⟨phenyl⟩–OCH$_3$ | 369 (Water) | 4 | 0.5 |
| 4 | H$_3$CO–⟨phenyl⟩– | 370 (Dioxane) | 4.1 | 0.7 |

Table A—Continued

| Example | R | Max. (mµ) and Solvent | $E_{max} \times 10^{-4}$ | $d_{400\,m\mu}$ |
|---|---|---|---|---|
| 5 | —C₆H₄—OC₆H₁₃ | 370 (Dioxane) | 5.0 | 0.25 |
| 6 | NaO₃S—C₆H₃(OC₆H₁₃)— | 368 (Water) | 3.2 | 0.55 |
| 7 | —C₆H₄—OC₁₀H₂₁ | 370 (Dioxane) | 5.8 | 0.3 |
| 8 | NaO₃S—C₆H₃(OC₁₀H₂₁)— | 370 (Water) | 4.0 | 0.6 |
| 9 | —C₆H₅ | 356 (Dioxane) | 3.8 | 0 |
| 10 | —C₆H₄—OC₁₀H₂₁ | 360 (Cyclohexane) | 4.0 | 0 |
| 11 | —C₆H₄—OH | 361 (Dioxane) | 3.0 | 0 |
| 12 | —C₆H₄—Cl | 345 (Dioxane) | 3.2 | .05 |
| 13 | —C₆H₄—CH₃ | 347 (Cyclohexane) | 3.6 | 0 |
| 14 | NaO₃S—C₆H₃(CH₃)— | 323 (Water) | 2.8 | 0 |
| 15 | H₃C—C₆H₃(CH₃)— | 348 (Cyclohexane) | 3.1 | 0 |
| 16 | H₉C₄—C₆H₃(CH₃)— | 345 (Cyclohexane) | 3.0 | 0 |
| 17 | H₉C₄—C₆H₂(NaO₃S)(CH₃)— | 309 (Water) | 2.2 | 0 |
| 18 | H₁₇C₈O—C₆H₃(CH₃)— | 335 (Cyclohexane) | 4.0 | 0 |
| 19 | H₇C₃,OC₆H₁₃—C₆H₂(CH₃)— | 309 (Cyclohexane) | 1.8 | 0 |

Table A—Continued

| Example | R | Max. (mµ) and Solvent | $E_{max} \times 10^{-4}$ | $d_{400\,m\mu}$ |
|---|---|---|---|---|
| 20 | (phenyl with CH₃ and NaO₃S substituents) | 356 (Cyclohexane) | 4.0 | 0 |
| 21 | (phenyl with CH₃ substituent) | 353 (Water) | 4.5 | 0.15 |
| 22 | H₇C₃—(phenyl)— | 360 (Cyclohexane) | 5.0 | 0.05 |
| 23 | H₇C₃—(phenyl with SO₃Na)— | 360 (Water) | 3.5 | 0.05 |
| 24 | (t) C₅H₁₁—(phenyl)— | 362 (Dioxane) | 4.5 | 0.05 |

EXAMPLE 25

An ultraviolet absorber of the invention was mordanted in a gelatin layer overcoated on a color reversal photographic film to serve as a taking filter. The ultraviolet absorber utilized was 2,5-bis(2-methoxy-x-sulfophenyl)-thiazolo[5,4-d]thiazole dipotassium salt. The mordanting material was prepared by combining with stirring 2,270 g. of 10% leached pigskin gelatin at 40° C., 45 cc. of 6 N glycolic acid solution and 1900 cc. of 12% solution of poly-α-methyl-allyl-N-guanidyl-ketimine (glycolic acid salt). This mixture was chilled to set the gelatin, the gelatin then being noodled and washed in cold water for 6 hours. The noodles were remelted at 50° C., cooled to 40° C. and water was added to make 6800 g. The pH was then adjusted to 6.5 with 6 N glycolic acid and the final weight was made up to 6800 g. A 409 g. portion of the resulting prepared composition to which had been added 1910 g. of distilled water was combined at 40° C. with stirring with 6050 g. of 1.5% aqueous solution of 2,5-bis(2-methoxy-x-sulfophenyl)thiazolo[5,4-d]-thiazole potassium salt. A coating aid and a gelatin hardener were then added to the mixture and the total made up to 15,890 g. The resulting dispersion was then coated over a color film at a coverage of 40 mg. per square foot of the ultraviolet absorber, 60 mg. per square foot of the poly-α-methyl-allyl-N-guanidyl-ketimine and 20 mg. per square foot of gelatin. The color film over which the described layer was coated comprised a cellulose acetate support containing superimposed gelatino-bromoiodide emulsion layers sensitized to red, green, and blue, with the red-sensitized layer next to the support and the blue-sensitive layer furthest from the support. The blue-sensitive and green-sensitive layers were separated by a yellow colloidal silver interlayer. The blue-sensitive layer contained dispersed therein an open-chain coupler having a reactive methylene group suitable for forming a yellow image with oxidized color developer, e.g. couplers Nos. I–V, McCrossen, U.S. Patent 2,875,057. The green-sensitive layer contained dispersed therein a pyrasolidone coupler suitable for forming a magenta image with oxidized color developer, e.g. couplers Nos. VII, etc. Fierke et al., U.S. Patent 2,801,171 (column 2). The red-sensitive layer contained dispersed therein a phenolic coupler suitable for forming a cyan image with oxidized color developer, e.g. couplers Nos. I to VI of Fierke et al., U.S. Patent 2,801,177 (column 2). The resulting color film was exposed in an Eastman Ib Sensitometer, and thereafter processed in a color reversal process. Other samples of film were incubated for seven days at 120° F. and 50% relative humidity before exposure in the sensitometer and processed. The exposed film was processed as follows:

The exposed film was developed in a developer having the following composition:

| | |
|---|---|
| Sodium hexametaphosphate | g.--- 2.0 |
| N-methyl-p-aminophenol sulfate | g.--- 6.0 |
| Sodium sulfite, anhydrous | g.--- 50.0 |
| Hydroquinone | g.--- 6.0 |
| Sodium carbonate monohydrate | g.--- 35.0 |
| Potassium bromide | g.--- 2.0 |
| Sodium thiocyanate | g.--- 1.5 |
| 0.5% solution of 6-nitrobenzimidazole nitrate | cc.--- 12.0 |
| 0.1% solution of potassium iodide | cc.--- 10.0 |
| Water to make 1 liter. | |

The element was then thoroughly washed with water and treated in a hardening bath having the following composition:

| | |
|---|---|
| Potassium chrome alum crystals | g.--- 30.0 |
| Water to make 1 liter. | |

The element was then thoroughly washed with water and treated for 30 seconds in a solution having the following composition:

| | G. |
|---|---|
| Sodium borohydride | 0.25 |
| Sodium hydroxide | 4.0 |
| Water to make 1 liter. | |

The element was then treated in a color developer having the following composition:

| | |
|---|---|
| Benzyl alcohol | cc.--- 6.0 |
| Sodium hexametaphosphate | g.--- 2.0 |
| Sodium sulfite, anhydrous | g.--- 5.0 |
| Trisodium phosphate | g.--- 40.0 |
| Potassium bromide | g.--- 0.25 |
| 0.1% solution of potassium iodide | cc.--- 10.0 |
| Sodium hydroxide | g.--- 6.5 |
| Color developer [1] | g.--- 11.33 |
| Ethylenediamine sulfate | g.--- 7.8 |
| Citrazinic acid | g.--- 1.5 |
| Water to make 1 liter. | |

[1] 4-amino-N-ethyl-N-(β-methanesulfonamidoethyl)-m-toluidine sesquisulfate monohydrate.

The element was then thoroughly washed with water and treated in a clearing and fixing bath having the following composition:

| | G. |
|---|---|
| Sodium thiosulfate | 150.0 |
| Sodium bisulfite | 20.0 |
| Water to make 1 liter. | |

The element was then treated in a bleach bath having the following composition:

| | G. |
|---|---|
| Potassium dichromate | 5.0 |
| Potassium ferricyanide | 70.0 |
| Potassium bromide | 20.0 |
| Water to make 1 liter. | |

The element was again washed and treated once again with the clearing and fixing bath identified above. The element was again washed and treated in a stabilizing bath having the following composition:

| | |
|---|---|
| Formaldehyde (37% by weight) cc__ | 7.0 |
| Dispersing agents [1] g__ | 0.5 |
| Water to make 1 liter. | |

[1] Triton X-100, i.e., an alkylaryl polyether alcohol (octylphenoxy polyethoxy ethanol).

All of the processing steps of the film samples were carried out at 80° F. Tables B and C below summarize the results of the sensitometric tests with respect to $D_{max}$ and relative speed for samples especially prepared and for samples that had been incubated for seven days at 120° F. and 50% relative humidity prior to exposure in the sensitometer.

tained when the ultraviolet absorbers described in Examples 1, 2, and 4–8 at coverages of 40 mg. per square foot are substituted for the 2,5-bis(2-methoxy-x-sulfophenyl)thiazolo[5,4-d]thiazole dipotassium salt.

EXAMPLE 26

A color-negative film was overcoated with an ultraviolet absorbing dye of the invention in a gelatin vehicle at a coverage of 108 mg. per square foot of 2,5-bis(2-decyloxy-x-sulfophenyl)thiazolo[5,4 - d]thiazole dipotassium salt and 120 mg. per square foot of gelatin. The color-negative film over which the described layer was coated comprised a cellulose acetate support containing superimposed gelatino-bromoiodide emulsion layers sensitized to red, green and blue, with the red-sensitized layer next to the support and the blue-sensitized layer furthest from the support. The red-sensitive layer contained dispersed therein a phenolic coupler suitable for forming a cyan image with oxidized color developer, e.g.—one of the compounds 1–10 set out in columns 1 to 3 of Weissberger et al., U.S. Patent 2,474,293, issued June 28, 1949. The green-sensitive layer contained dispersed therein a pyrazolone coupler suitable for forming a magenta image with oxidized color developer, e.g.—one of compounds 1 to 12 set out in columns 2 and 3 of Loria et al., U.S. Patent 2,600,788, issued June 17, 1952. The blue-sensitive layer contained dispersed therein an open-chain coupler having a reactive methylene group suitable for forming a yellow image with oxidized color developer, e.g.—one of the coupler compounds I to XV set out in Tables 3–6 of McCrossen et al. U.S. Patent 2,875,057, issued February 24,

*Table B*

| Addenda | Red | | Green | | Blue | |
|---|---|---|---|---|---|---|
| | $D_{max}$ | Relative Speed | $D_{max}$ | Relative Speed | $D_{max}$ | Relative Speed |
| Control | 3.15 | 100 | 3.68 | 100 | 3.80 | 100 |
| UV Absorbers | 3.11 | 91 | 3.56 | 91 | 3.80 | 87 |

*Table C*

[After incubation for 7 days at 120° F. and 50% relative humidity]

| Addenda | Red | | Green | | Blue | |
|---|---|---|---|---|---|---|
| | $\Delta D_{max}$ | $\Delta$Relative Speed | $\Delta D_{max}$ | $\Delta$Relative Speed | $\Delta D_{max}$ | $\Delta$Relative Speed |
| Control | −.18 | +10 | −.24 | +26 | −.10 | +26 |
| UV Absorbers | −.22 | +10 | −.36 | +10 | 0 | +5 |

Also, in the above tables the relative speeds indicated are a function of the exposure necessary to give a density of 0.2 above background fog, the initial control speed being taken as 100 in each case. As can be observed from the data set out in Table C, the speed of the blue-sensitive layer was reduced. The resulting color reversal transparency was substantially completely free of blue shadowing and blue fringing, the wave lengths shorter than about 410 mµ having been absorbed before reaching the light-sensitive layers of the film. Further, it should be noted from the data set out in the above tables that the other sensitometric properties of the color film were not substantially affected by the presence of the ultraviolet absorber on the photographic element. Similar results are ob- 1959. The resulting color film was exposed in an Eastman Ib Sensitometer and thereafter processed by the color process summarized below in Table D and described in more detail thereafter.

*Table D*

| Processing solution: | Time, min. |
|---|---|
| (1) Color developer | 11.5 |
| (2) Acid stop bath | 6 |
| (3) Formalin hardener | 4 |
| (4) Water wash | 4 |
| (5) Ferricyanide bleach | 6.5 |
| (6) Water wash | 4 |
| (7) Hypo | 4.5 |
| (8) Water wash | 8 |

The various processing solutions had essentially the compositions set out below:

COLOR DEVELOPER

| | |
|---|---|
| Benzyl alcohol ml | 5.0 |
| Sodium hexametaphosphate g | 2.50 |
| Sodium sulfite g | 1.85 |
| Sodium bromide g | 1.40 |
| Potassium iodide mg | 0.5 |
| Sodium hydroxide g | 13.1 |
| Borax g | 39.6 |
| 4-amino-N-ethyl-3-methyl-N-β-methylsulfonamidoethylaniline g | 5.0 |

Water to make 1 liter.

ACID STOP BATH

| | |
|---|---|
| Acetic acid (glacial) ml | 8.6 |

Water to make 1 liter.

FORMALIN HARDENER

| | |
|---|---|
| Formalin (37% by weight formaldehyde in water) ml | 20.0 |
| Sodium bisulfate g | 5.00 |
| Borax g | 3.82 |
| Sodium hydroxide g | 4.50 |

Water to make 1 liter.

FERRICYANIDE BLEACH

| | G. |
|---|---|
| Potassium ferricyanide | 18.0 |
| Sodium bromide | 12.8 |
| Boric acid | 7.3 |
| Boric acid | 15.0 |

Water to make 1 liter.

HYPO

| | G. |
|---|---|
| Sodium sulfite | 5.90 |
| Sodium thiosulfate | 320 |
| Sodium bisulfite | 1.47 |

Water to make 1 liter.

The ultraviolet absorber substantially completely eliminated blue shadowing and blue fringing on the resulting processed color negative and produced an effective blue speed loss of about 0.2 log $E$. Wave lengths shorter than about 410 mµ were absorbed by the ultraviolet absorber in the overcoat layer of the photographic element before reaching the light-sensitive layers thereof. A major portion of the ultraviolet absorber remained on the processed film after the color process and the visible light absorption caused by the ultraviolet absorbers increased the yellow $D_{min}$ of the film by the very small factor of approximately 0.02. Similar results were obtained when the described color-negative film was overcoated with an aqueous dispersion of gelatin and 2,5-bis(2-decyloxy-x-sulfophenyl) thiazolo[5,4-d]thiazole potassium salt coated at a coverage of 72 mg. of 2,5-bis(2-decyloxy - x - sulfophenyl) thiazolo[5,4-d]thiazole potassium salt per square foot and 120 mg. of gelatin per square foot.

EXAMPLE 27

The color-negative film described in Example 26, having coated thereover an ultraviolet taking filter containing 2,5-bis(2-decyloxy-x-sulfophenyl)thiazolo[5,4-d]thiazole potassium salt dispersed in cellulose ether phthalate as a vehicle in lieu of gelatin, was prepared. The ultraviolet taking filter was coated over the color-negative film at a coverage of 75 mg. of 2,5-bis(2-decyloxy-x-sulfophenyl)thiazolo[5,4-d]thiazole potassium salt per square foot and 100 mg. of cellulose ether phthalate per square foot. The resulting photographic element, when exposed and processed as described in Example 26, had a reduced blue speed of about 0.2 log $E$ and all light of wave lengths of less than about 410 mµ was absorbed by the filter layer. The ultraviolet absorbing overcoat was readily removed during the processing.

EXAMPLE 28

A colorless ultraviolet absorber of the invention was applied to finished color prints in a postprocessing bath and the stability of the dyes in the treated color prints was substantially increased. When the color print was exposed to sunlight, improvement in dye stability, particularly the yellow and magenta dyes, and reduced print out were observed. More specifically, 2,5-bis(2-methyl-x - sulfophenyl)thiazolo[5,4-d]thiazole disodium salt dihydrate in a bath buffered to a pH of 3.5 with citric acid-borax at concentrations of 3 to 20 grams per liter was utilized as the postprocessing bath. Samples of the treated color prints were exposed to sunlight in Dallas, Texas, for 500,000 foot-candle hours and the loss in dye densities and print out determined. Samples of color prints not treated with the described postprocessing bath were included for purposes of comparison. The results of the test are summarized by the data set out in Table E below.

*Table E*

| Conc. of UV Absorber in Bath (g./l.) | Percent Loss of Density | | | |
|---|---|---|---|---|
| | Cyan | Magenta | Yellow | Print Out [1] |
| 0 | 2 | 24 | 55 | +.27 |
| 3 | 1 | 20 | 41 | +.04 |
| 10 | | | 20 | 34 | +.02 |
| 20 | | | | 31 | 0 |

[1] Density increase through blue filter read at $D_{min}$.

The color prints tested contained dyes resulting from the development with a 4-amino-N-ethyl-3-methyl-N-β-methylsulfonamidoethyl-aniline developer and a cyan-forming coupler of the type described in Salminen et al., U.S. Patent 2,423,730, issued July 8, 1947, a magenta-forming coupler of the type described in Loria et al., U.S. Patent 2,600,788, issued June 17, 1952, and a yellow-forming coupler of the type described in McCrossen et al., U.S. Patent 2,875,057, issued February 24, 1959. Similar results are obtained when the ultraviolet absorbers described in Examples 9, 11–16, and 20–24 at concentrations of 3 to 20 grams per liter in the described postprocessing bath in lieu of the 2,5-bis(2-methyl-x-sulfo phenyl)-thiazolo[5,4-d]thiazole disodium salt are utilized.

In general, the addenda of the invention can be prepared by reacting dithiooxamide with a benzaldehyde. Examples 29 and 30 below illustrate this method of preparation for illustrative ultraviolet absorbers of the invention.

EXAMPLE 29.—PREPARATION OF 2,5-BIS(2-DECYLOXY - x - SULFO PHENYL)THIAZOLO[5,4 - d]-THIAZOLE POTASSIUM SALT

Forty-eight grams (0.4 mole) of dithiooxamide and 250 grams (0.96 mole) of 2-decyloxybenzaldehyde are intimately mixed in a 250 cc. Erlenmeyer flask. The mixture is heated with stirring to 160° C. by means of an oil bath. At this point, a spontaneous reaction occurs and water vapor is evolved. When this reaction has ceased, the temperature of the oil bath is raised to 205–210° C. and held there for 1½ hours. The reaction mixture is cooled somewhat and poured with vigorous stirring into 1000 ml. of acetone. The grayish-yellow precipitate is collected by filtration and recrystallized from benzene. On partial evaporation of the solvent, 150 grams of light yellow crystals, melting point 102–103° C. is obtained. Fifty grams (0.083 mole) of the resulting 2,5-bis(2-decyloxyphenyl)thiazolo[5,4-d]thiazole is added slowly with stirring to 250 ml. of chlorosulfonic acid. A slight rise in temperature is noted. Stirring is continued for two hours. At the end of this time, the mixture is poured slowly onto 2 kg. of ice with stirring. The precipitate, which presumably consists mainly of the disulfonylchloride, is collected, washed with a little water, and pressed dry. The filter cake is added to 2 liters of methanol and the suspension heated to boiling with vigorous stirring. Sufficient saturated aqueous potassium acetate is added to render the mixture neutral to Congo red. The bright yellow precipitate is collected, washed with methanol, and extracted with 1000 ml. of boiling dimethylformamide. The mixture is filtered, and the filtrate is concentrated under reduced pressure until the product begins to crystallize. The solid is collected, washed with ether to remove occluded dimethylformamide and dried. There is obtained 55 grams of a pale yellow powder, 2,5-bis(2-decyloxy-x-sulfo phenyl)thiazolo[5,4-d]thiazole potassium salt.

EXAMPLE 30.—PREPARATION OF 2,5-BIS(2-METHOXY - x - SULFO PHENYL)THIAZOLO-[5,4-d] THIAZOLE POTASSIUM SALT

In a 500 ml., round-bottomed flask fitted with a magnetic stirrer and a 10-inch condenser is placed 48 g. (0.40 mole) of dithiooxamide and 162 g. (1.0 mole) of o-methoxybenzaldehyde. The contents of the flask are heated to 170° C., at which point a spontaneous reaction takes place. After the reaction has stopped, heating is continued to 180–190° C. for 15–20 minutes. Water vapor is evolved, and the contents of the flask crystallize. The flask is cooled and the semi-crude product washed into a beaker with acetone. Enough acetone is added to bring the volume to 800 ml., and the slurry is stirred vigorously. The precipitate is collected and washed with acetone until the washings are colorless. The yield of yellow crystals, M.P. 254–256° C., is 85 g. A 2-liter Erlenmeyer flask containing a magnetic stirrer and surrounded by an ice-water bath is charged with 850 ml. of 20% oleum. To the cooled acid is added, in small portions, 85 g. (0.24 mole) of the resulting 2,5-bis(2-methoxyphenyl)thiazolo [5,4-d]thiazole at such a rate that the temperature does not exceed 25° C. Stirring is continued until all the solid material has dissolved and a drop of the reaction mixture in water gives a clear solution. This requires approximately one-half hour. The mixture is poured on ice (about 3 kg.) and the resultant yellow precipitate of sulfonic acid is collected by vacuum filtration and sucked as dry as possible. The cake is dissolved in about 1200 ml. of hot water, and the solution is filtered. Potassium acetate is added, with vigorous stirring, to the filtrate until the mixture is neutral to Congo red. After cooling below room temperature, the yellowish crystalline precipitate is collected and dried; the yield is 145 g. of 2,5-bis-(2 - methoxy - x - sulfophenyl)thiazolo[5,4 - d]thiazole potassium salt.

The invention has been described in considerable detail with particular reference to preferred embodiments thereof, but it will be understood that variations and modifications can be effected within the spirit and scope of the invention as described hereinabove and as defined in the appended claims.

I claim:
1. A photographic element containing as an ultraviolet filter therefor at least 10 mg. per square foot of said element of a compound having the formula

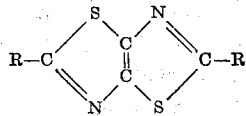

wherein R is a phenyl radical.

2. A color photographic element containing as an ultraviolet filter therefor at least 10 mg. per square foot of said element of a compound having the formula

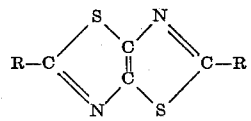

wherein R is a phenyl radical having the formula

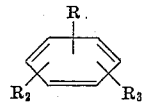

wherein
(a) $R_1$ and $R_2$ are each selected from the group consisting of a hydrogen atom, an alkyl radical, an alkoxy radical, a halogen atom, and a hydroxy radical, and
(b) $R_3$ is selected from the group consisting of a hydrogen atom, an alkyl radical, an alkoxy radical, a halogen atom, a hydroxy radical, and an acidic salt-forming radical.

3. A color photographic element comprising a support, a plurality of photographic silver halide emulsion layers differentially sensitized to red, green and blue light and an ultraviolet filter for said emulsion layers comprising at least 10 mg. per square foot of said element of an ultraviolet absorbing compound having a modicum of absorption in the visible portion of the spectrum up to about 410 mµ and having the formula

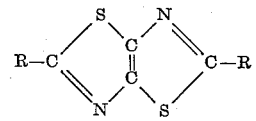

wherein R is a phenyl radical having the formula

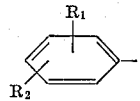

wherein
(a) $R_1$ is selected from the group consisting of an alkoxy radical having 1 to 22 carbon atoms and a hydroxy radical, and
(b) $R_2$ is selected from the group consisting of a hydrogen atoms and an acidic salt-forming radical,
said phenyl radical being free of said alkoxy and hydroxy radicals in the meta position.

4. A color photographic element as described in claim 3 wherein the ultraviolet absorbing compound is mordanted in an overcoat layer on said support.

5. A color photographic element as described in claim 3 wherein the ultraviolet absorbing compound is in a gelatin substrate overcoated on said support.

6. A color photographic element as described in claim 3 wherein the ultraviolet absorbing compound is in a cellulose ether phthalate substrate overcoated on said support.

7. A color photographic element as described in claim 3 wherein $R_2$ is a sulfo radical.

8. A color photographic element comprising a support, a plurality of photographic silver halide emulsion layers differentially sensitized to red, green, and blue light and an ultraviolet filter for said emulsion layers comprising at least 10 mg. per square foot of said element of an alkali metal salt of 2,5-bis(o-methoxy-x-sulfophenyl) thiazolo[5,4-d]thiazole mordanted in an overcoat layer on said support.

9. A color photographic element comprising a support, a plurality of photographic silver halide emulsion layers differentially sensitized to red, green, and blue light and an ultraviolet filter for said emulsion layers comprising at least 10 mg. per square foot of said element of an alkali metal salt of 2,5-bis(o-decyloxy-x-sulfophenyl) thiazolo[5,4-d]thiazole in an overcoat layer on said support.

10. A finished color photographic element comprising a support, a plurality of developed and fixed photographic emulsion layers containing developed dye images, at least one of said dye images being subject to fading by the action of ultraviolet light, and an ultraviolet filter for said emulsion layers comprising at least 10 mg. per square foot of said element of a substantially colorless ultraviolet absorber having the formula

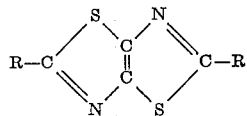

wherein R is a phenyl radical having the formula

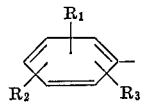

wherein
(a) $R_1$ and $R_2$ are each selected from the group consisting of a hydrogen atom, an alkyl radical having 1 to 22 carbon atoms, an alkoxy radical having 1 to 22 carbon atoms, and a hydroxy radical, and
(b) $R_3$ is selected from the group consisting of a hydrogen atom, an alkyl radical having 1 to 22 carbon atoms, an alkoxy radical having 1 to 22 carbon atoms, a hydroxy radical and an acidic salt-forming radical,
said phenyl radical being free of said alkoxy and hydroxy radicals in the ortho and para positions.

11. A finished color photographic element as described in claim 10 wherein $R_3$ is a sulfo radical.

12. A finished color photographic element comprising a support, a plurality of developed and fixed photographic emulsion layers containing developed dye images, at least one of said dye images being subject to fading by the action of ultraviolet light, and an ultraviolet filter for said emulsion layers comprising at least 10 mg. per square foot of said element of an alkali metal salt of 2,5-bis(o-methoxy-x-sulfophenyl)thiazolo[5,4-d]thiazole.

13. A color photographic element containing as an ultraviolet filter therefor at least 10 mg. per square foot of said element of a compound selected from the group consisting of:

(1) 2,5-bis(o-hydroxyphenyl)-thiazolo[5,4-d]thiazole,
(2) 2,5-bis(p-hydroxyphenyl)thiazolo[5,4-d]thiazole,
(3) 2,5-bis(o-methoxy-x-sulfophenyl)thiazolo[5,4-d]thiazole, disodium salt,
(4) 2,5-bis(p-methoxyphenyl)thiazolo[5,4-d]thiazole,
(5) 2,5-bis(o-hexyloxyphenyl)thiazolo[5,4-d]thiazole,
(6) 2,5-bis(o-hexyloxy-x-sulfophenyl)thiazolo[5,4-d]thiazole, disodium salt,
(7) 2,5-bis(o-decyloxyphenyl)thiazolo[5,4-d]thiazole,
(8) 2,5-bis(o-decyloxy-x-sulfophenyl)thiazolo[5,4-d]thiazole, disodium salt,
(9) 2,5-bis(phenyl)thiazolo[5,4-d]thiazole,
(10) 2,5-bis(m-decyloxyphenyl)thiazolo[5,4-d]thiazole,
(11) 2,5-bis(m-hydroxyphenyl)thiazolo[5,4-d]thiazole,
(12) 2,5-bis(o-chlorophenyl)thiazolo[5,4-d]thiazole,
(13) 2,5-bis(o-methylphenyl)thiazolo[5,4-d]thiazole,
(14) 2,5-bis(o-methyl-x-sulfophenyl)thiazolo[5,4-d]thiazole, disodium salt,
(15) 2,5-bis(2,5-dimethylphenyl)thiazolo[5,4-d]thiazole,
(16) 2,5-bis(5-butyl-2-methylphenyl)thiazolo[5,4-d]thiazole,
(17) 2,5-bis(5-butyl-2-methyl-x-sulfophenyl)thiazolo[5,4-d]thiazole, disodium salt,
(18) 2,5-bis(2-methyl-5-octyloxyphenyl)thiazolo[5,4-d]thiazole,
(19) 2,5-bis(3-butyl-2-hexyloxy-6-methylphenyl)thiazolo[5,4-d]thiazole,
(20) 2,5-bis(m-methylphenyl)thiazolo[5,4-d]thiazole,
(21) 2,5-bis(m-methyl-x-sulfophenyl)thiazolo[5,4-d]thiazole, disodium salt,
(22) 2,5-bis(p-propylphenyl)thiazolo[5,4-d]thiazole,
(23) 2,5-bis(p-propyl-x-sulfophenyl)thiazolo[5,4-d]thiazole, disodium salt, and
(24) 2,5-bis(p-amylphenyl)thiazolo[5,4-d]thiazole.

14. The process for treating a finished color photographic element having a support and a plurality of developed and fixed photographic gelatino-emulsion layers containing developed dye images, at least one of said dye images being subject to fading by the action of ultraviolet light, which comprises immersing said element in a solution of a substantially colorless ultraviolet absorbing compound and imbibing at least 10 mg. per square foot of said element of said ultraviolet absorbing compound in said gelatino-emulsion layers, said ultraviolet absorbing compound having the formula

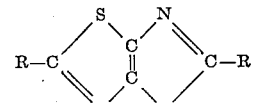

wherein R is a phenyl radical having the formula

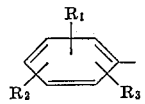

wherein
(a) $R_1$ and $R_2$ are each selected from the group consisting of a hydrogen atom, an alkyl radical having 1 to 7 carbon atoms, an alkoxy radical having 1 to 7 carbon atoms and a hydroxy radical, and
(b) $R_3$ is selected from the group consisting of a hydrogen atom, an alkyl radical having 1 to 7 carbon atoms, an alkoxy radical having 1 to 7 carbon atoms, a hydroxy radical and an acidic salt-forming radical,
said phenyl radical being free of alkoxy and hydroxy radicals in the ortho and para positions.

References Cited by the Examiner

UNITED STATES PATENTS

| 2,000,587 | 5/1935 | Fordyce | 96—84 |
| 2,496,843 | 2/1950 | Anish | 96—84 |
| 2,976,259 | 3/1961 | Hardy et al. | 252—300 |
| 3,042,521 | 7/1962 | Dersch et al. | 96—109 |

FOREIGN PATENTS

| 166,239 | 2/1959 | Sweden. |

OTHER REFERENCES

Johnson et al.: Journ. of American Chem. Soc., vol. 82, No. 11, June 5, 1960, pages 2719–2724.

NORMAN G. TORCHIN, *Primary Examiner.*

A. LIBERMAN, *Examiner.*

R. H. SMITH, *Assistant Examiner.*